(12) United States Patent
Phillips et al.

(10) Patent No.: US 7,544,110 B1
(45) Date of Patent: Jun. 9, 2009

(54) MARINE TRANSMISSION ACTUATION SYSTEM

(75) Inventors: George E. Phillips, Oshkosh, WI (US);
Richard A. Davis, Mequon, WI (US);
Wayne M. Jaszewski, Jackson, WI (US)

(73) Assignee: Brunswick Corporation, Lake Forest, IL (US)

( * ) Notice: Subject to any disclaimer, the term of this patent is extended or adjusted under 35 U.S.C. 154(b) by 70 days.

(21) Appl. No.: 11/893,746

(22) Filed: Aug. 17, 2007

(51) Int. Cl.
*B63H 23/00* (2006.01)
*B63H 21/21* (2006.01)
*F16D 21/04* (2006.01)

(52) U.S. Cl. .............. 440/75; 440/86; 192/21
(58) Field of Classification Search ............ 440/75, 440/86
See application file for complete search history.

(56) References Cited

U.S. PATENT DOCUMENTS

| | | | |
|---|---|---|---|
| 3,623,583 A | 11/1971 | Shimanckas | 192/51 |
| 3,919,964 A | 11/1975 | Hagen | 115/34 R |
| 3,922,997 A | 12/1975 | Jameson | 115/37 |
| 5,328,396 A | 7/1994 | Hayasaka | 440/86 |
| 5,902,160 A | 5/1999 | Weronke et al. | 440/88 |
| 6,062,926 A | 5/2000 | Alexander et al. | 440/75 |
| 6,129,599 A | 10/2000 | Hallenstvedt et al. | 440/86 |
| 6,176,750 B1 | 1/2001 | Alexander et al. | 440/75 |
| 6,884,131 B2 * | 4/2005 | Katayama et al. | 440/75 |
| 6,966,805 B1 * | 11/2005 | Caldwell | 440/75 |
| 7,104,857 B1 | 9/2006 | Swan et al. | 440/615 |
| 7,291,048 B1 * | 11/2007 | Phillips et al. | 440/75 |

OTHER PUBLICATIONS

U.S. Appl. No. 11/786,821, filed Apr. 13, 2007, Phillips et al.

* cited by examiner

*Primary Examiner*—Jesus D Sotelo
(74) *Attorney, Agent, or Firm*—William D. Lanyi

(57) ABSTRACT

An actuator for a marine transmission uses four cavities of preselected size in order to provide four potential forces resulting from pressurized hydraulic fluid within those cavities. The effective areas of surfaces acted upon by the hydraulic pressure are selected in order to provide increased force to move the actuator toward a neutral position from either a forward or reverse gear position. Also, the relative magnitudes of these effective areas are also selected to provide a quicker movement into gear than out of gear, given a similar differential magnitude of pressures within the cavities.

20 Claims, 5 Drawing Sheets

MARINE TRANSMISSION ACTUATION SYSTEM

BACKGROUND OF THE INVENTION

1. Field of the Invention

The present invention is generally related to a transmission actuation system and, more particularly, to a hydraulically assisted shift mechanism that is configured to move a marine transmission between forward, neutral and reverse gear positions.

2. Description of the Related Art

Those skilled in the art of marine propulsion systems are aware of many different types of shifting mechanisms that can be used to move a transmission between forward, neutral and reverse gear positions. Typical marine transmissions, particularly for use in conjunction with outboard motors and stern-drive systems, use mechanical linkages to perform these functions. Some transmissions are hydraulically assisted and use pressurized hydraulic fluid to move an actuator between various gear positions. Typically, a hydraulic pump is driven by a driveshaft of the outboard motor to generate pressurized hydraulic fluid that is ported to appropriate cavities and conduits to move an actuator.

U.S. Pat. No. 3,623,583, which issued to Shimanckas on Nov. 30, 1971, describes an electrically operated control mechanism for a hydraulic shifting mechanism. It includes a hydraulic mechanism which is operative to effect shifting of a clutch from a fail-safe forward drive condition to either of a neutral or reverse condition. Also disclosed is an electrically operated control mechanism for the hydraulic mechanism, which control mechanism is also designed to fail safe in forward drive. The mechanism includes aligned, neutral and rearward drive solenoids which are selectively energizeable to afford neutral and reverse drive and which are operably associated with a single plunger carrying a spool valve embodied in the hydraulic system.

U.S. Pat. No. 3,919,964, which issued to Hagen on Nov. 18, 1975, describes a marine propulsion reversing transmission with hydraulic assist. It is located in a propulsion unit and connects a driveshaft to a propeller shaft. It is shiftable between neutral, forward drive, and rearward drive conditions. A mechanical linkage includes a shift actuator carried by the propeller shaft for common rotary movement with the propeller shaft and for axial movement relative to the propeller shaft and connected to a clutch dog for common movement therewith, together with a rod movable transversely of the shift actuator and a coupling connecting the rod and the shift actuator for effecting shift actuator movement in one direction axially of the propeller shaft in response to rod movement in one direction transversely of the propeller shaft and for effecting shift actuator movement in the other direction in response to rod movement in the other direction and for simultaneously permitting rotary shift actuator movement relative to the rod.

U.S. Pat. No. 3,922,997, which issued to Jameson on Dec. 2, 1975, describes a marine power transmission system. It has an input shaft for connection to a single main propulsion engine, a pair of parallel output shafts and a pair of fluid actuated friction clutches disposed on each output shaft for selectively engaging gear sets to drive the output shafts in the same or opposite directions of rotation independently or simultaneously.

U.S. Pat. No. 5,328,396, which issued to Hayasaka on Jul. 12, 1994, describes a power transmission system for an inboard/outboard motor. A hydraulic pump for actuating clutches and for lubricating the transmission is driven off the rear end of the input shaft and control valve means selectively communicating the fluid from the hydraulic pump with the hydraulic clutches. The valve means is a rotary plug type valve but is constructed so as to minimize axial and radial forces acting that would tend to bind its movement.

U.S. Pat. No. 5,902,160, which issued to Weronke et al. on May 11, 1999, discloses a twin propeller marine propulsion unit. A vertical driveshaft is journaled in a lower gear case and drives a pair of bevel gears. A pair of concentric propeller shafts are mounted in the lower torpedo section of the gear case and each shaft carries a propeller. A slidable clutch is movable between a neutral, a forward, and a reverse position and serves to operably connect the outer propeller shaft with one of the bevel gears when the clutch is moved to the forward drive position.

U.S. Pat. No. 6,062,926, which issued to Alexander et al. on May 16, 2000, discloses a hydraulic system for a dual propeller marine propulsion unit. An improved hydraulic system for a twin propeller marine propulsion unit is described in which a vertical driveshaft is operably connected to the engine of the propulsion unit and carries a pinion that drives a pair of coaxial bevel gears. An inner propeller shaft and an outer propeller shaft are mounted concentrically in the lower torpedo section of the gear case and each propeller shaft carries a propeller. The hydraulic system includes a pump connected to the inner propeller shaft, and the pump has an inlet communicating with a fluid reservoir in the gear case and has an outlet which is connected through a hydraulic line to the multi-disc clutch.

U.S. Pat. No. 6,129,599, which issued to Hallenstvedt et al. on Oct. 10, 2000, describes a transmission assembly for a marine vessel. An electrically controlled transmission system for a marine vessel is adapted to avoid vibration to the vessel during a shifting process of the transmission system.

U.S. Pat. No. 6,176,750, which issued to Alexander et al. on Jan. 23, 2001, discloses a marine propulsion unit with a hydraulic pump. A hydraulically operated multi-disc clutch is actuated when engine speed reaches a pre-selected elevated value to operably connect the second of the bevel gears to an outer propeller shaft, to thereby drive the second propeller in an opposite direction to a first propeller.

U.S. Pat. No. 6,884,131, which issued to Katayama et al. on Apr. 26, 2005, describes a shift mechanism for a marine propulsion unit. An outboard motor incorporates a driveshaft and a propulsion shaft driven by the driveshaft. The driveshaft carries a pinion. The propulsion shaft carries forward and reverse gears. The pinion always meshes with the forward and reverse gears and drives the forward and reverse gears in opposite directions relative to each other. A hydraulic forward clutch mechanism couples the forward gear with the propulsion shaft. A hydraulic reverse clutch mechanism couples the reverse gear with the propulsion shaft.

U.S. Pat. No. 7,104,857, which issued to Swan et al. on Sep. 12, 2006, discloses a method for controlling a hydraulically assisted steering system of a marine vessel. The system provides a controller which activates a hydraulic pump when a manual throttle selector handle is in either forward or reverse gear selector positions, but deactivates the pump when the handle is in a neutral gear selector position. A controller can also interrogate an ignition key to make sure that it is in an on position and also respond to the activation of a manual switch which can be used to override the deactivation step of the pump.

U.S. patent application Ser. No. 11/786,821, which was filed on Apr. 13, 2007 (M10112) by Phillips et al., discloses an actuator device for a marine propulsion transmission. The actuator is attached to a movable clutch member through the use of a coupler which comprises a generally spherical member formed as a portion of the actuator and a chuck device formed as part of the clutch member. The generally spherical member, or alternatively shaped component, is received by the chuck device and retained therein. The components are configured to allow relative rotation between the actuator and the clutch member while causing them to move axially in synchrony with each other.

The patents described above are hereby expressly incorporated by reference in the description of the present invention.

In some marine transmissions, greater force is needed to move a transmission into a neutral position, from either a forward or reverse position, than is normally required to move the transmission into a forward or reverse gear position from the neutral position. On the other hand, it is often desirable to move the transmission into either forward or reverse gear, from a neutral position, more swiftly than when the transmission is moved into neutral from either a forward or reverse gear position. It would therefore be significantly beneficial if an actuator system could be provided that provides greater force to move the transmission out of gear, into a neutral position, than is provided to move the transmission into gear. It would also be beneficial if the speed of actuation into gear, from a neutral position, could be provided which is greater than the speed in which the actuator moves the transmission out of gear. Furthermore, it would be significantly beneficial if an actuator could be provided which is simple in structure and operation and relatively inexpensive to manufacture and assemble.

SUMMARY OF THE INVENTION

A marine transmission actuation system, made in accordance with a preferred embodiment of the present invention, comprises a housing structure, an actuator which is movable supported within the housing structure, first, second, third, and fourth cavities disposed at least partially between the actuator and the housing structure, and first, second, third, and fourth surfaces of the actuator which have effective areas that are responsive to pressures within associated cavities in order to exert forces against the actuator in preselected directions. The sizes of the effective areas of the surfaces are chosen to result in force magnitudes that serve particular purposes and deliver the force at particular speeds well equipped to each other.

In a particularly preferred embodiment of the present invention, the first and third surfaces are movable relative to each other and the second and fourth surfaces are movable relative to each other. The actuator is slidably supported by the housing structure for movement along an axis. In one embodiment of the present invention, the actuator comprises a piston member and first and second rings which define the third and fourth surfaces. The first and second rings can be movable relative to the piston member in a direction parallel to the axis.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
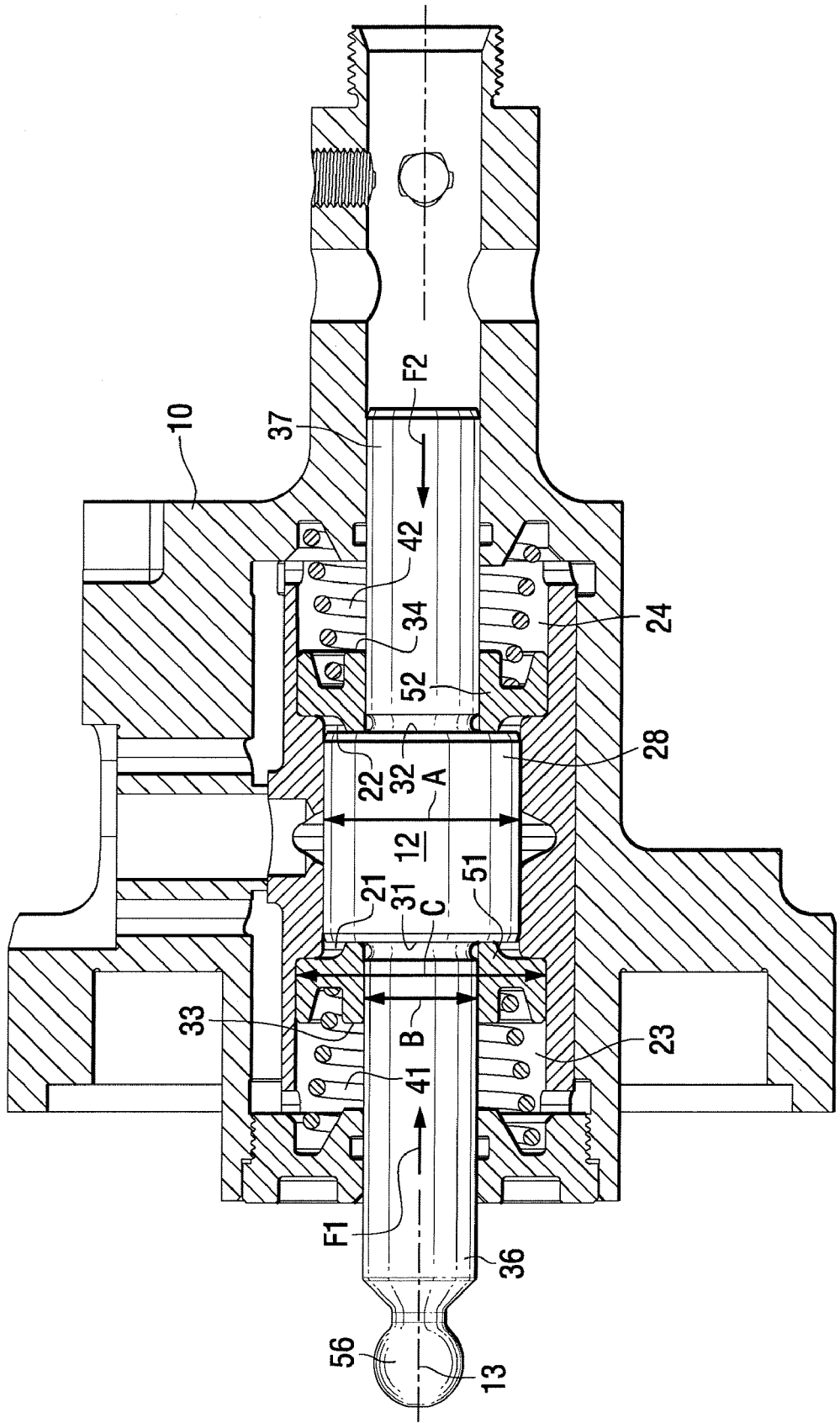
FIG. 1 is a section view of a preferred embodiment of the present invention shown in a neutral gear position.

Throughout the description of the preferred embodiment of the present invention, like components will be identified by like reference numerals.

FIG. 1 is a section view of a marine transmission actuation system made in accordance with a preferred embodiment of the present invention. It comprises a housing structure 10 and an actuator 12 that is movably supported within the housing structure. Four cavities are defined by the relative positions of the actuator 12 and the housing structure 10. A first cavity 21 is illustrated at the left side of the barrel portion 28 of the actuator 12 and a section cavity 22 is located at the right side of the barrel portion. A third cavity 23 and a fourth cavity 24 are also illustrated in FIG. 1. First, second, third, and fourth surfaces, 31-34, of the actuator 12 have effective areas which are responsive to pressure within the associated cavities, 21-24. These pressures, which are hydraulic oil pressure in a is preferred embodiment of the present invention, exert forces against the actuator 12 in directions which are generally away from their associated cavities. As an example, increased pressure within the first cavity 21 exerts a force on the first surface 31 of the actuator 12 in the direction represented by arrow F1. Similarly, an increase in pressure within the second cavity 22 creates a force against the second surface 32 in a second direction F2. Each of the four surfaces, 31-34, have an effective area that is generally defined by the geometry of the associated cavity. In other words, pressure within the first cavity 21 acts on the annular surface 31 which has an effective area determined by both the diameter of the barrel portion 28 of the actuator 12 and the diameter of the shaft 36 extending toward the left in FIG. 1 from the barrel portion. The hydraulic pressure within the first cavity 21 acts on this annular surface to provide a force F1 that tends to move the actuator 12 in a direction toward the right in FIG. 1. The simultaneous pressures in the other cavities also relate to the effect on the actuator 12. These will be described in greater detail below.

With continued reference to FIG. 1, the actuator 12 is shown in a centered, or neutral, position. Two springs, 41 and 42, assist in maintaining the neutral position of the actuator 12 when the actuator is not being acted upon by differential pressures in the various cavities, 21-24. The actuator 12 comprises the piston member, a first ring 51 and a second ring 52. The first ring 51 defines the third surface 33 and the second ring 52 defines the fourth surface 34. The first and second rings, 51 and 52, are movable relative to the piston member of the actuator 12 which, in turn, comprises the barrel portion 28, the shaft 36, and the shaft 37.

With continued reference to FIG. 1, the end of the actuator 12 comprises a ball portion 56. The ball portion 56 facilitates the connection to a dog clutch. This type of mechanism is described in greater detail in the Phillips et al. patent application identified above. However, it should be clearly understood that the precise means for attaching the actuator 12 to the clutch mechanism is not limiting to the present invention.

The first and second rings, 51 and 52, are shown in FIG. 1 in contact with the first and second surfaces, 31 and 32. However, since the first and second rings are movable relative to the barrel portion 28 of the actuator 12, they are free to move out of contact with the first and second surfaces, respectively, as a function of the forces provided by the pressures within the four cavities, 21-24, and the forces provided by the first and second springs, 41 and 42.

In FIG. 1, three diameters, A, B, and C, are specifically identified. Diameter A is the diameter of the barrel portion 28 of the actuator 12, diameter B is the diameter of the shafts, 36 and 37, and diameter C is the outer diameter of the first and second rings, 51 and 52. For purposes of the following description, the diameters of the two shafts, 36 and 37, will be presumed to be equal to each other. In addition, the outer diameters of the first and second rings, 51 and 52, will be presumed to be equal to each other and the diameter of the barrel portion 28 will be presumed to be consistent throughout its axial length. The effective area of the first and second surfaces, 31 and 32, can be determined as a function of diameters A and B. The effective area of the third and fourth surfaces, 33 and 34, can be determined as a function of diameters B and C. Since diameter C is intentionally greater than diameter A, the effective area of the third and fourth surfaces, 33 and 34, is greater than the effective area of the first and second surfaces, 31 and 32. As a result, if equal hydraulic pressure exists within the first and third cavities, 21 and 23, the first ring 51 will be forced toward the right against the step formed in the housing structure 10 and illustrated in FIG. 1 and the barrel portion 28 will experience a force F1 against the first surface 31 which will cause the actuator 12 to move toward the right. This, of course, presumes that the pressures within the second and fourth cavities, 22 and 24, are at a reduced magnitude to allow hydraulic fluid to flow out of them back toward a central reservoir. Movement of the barrel portion 28 toward the right in FIG. 1 will push the second ring 52 toward the right against the force provided by the second spring 42. Naturally, any desired movement of the actuator 12 will necessitate an appropriate calculation of the relative hydraulic pressures in the four cavities, 21-24, in relation to the axial forces provided by the first and second springs, 41 and 42.

With continued reference to FIG. 1, the present invention will be described in terms of a three position actuator in which the position shown in FIG. 1 is the neutral, or central position, and movement of the actuator 12 toward the left in FIG. 1 is a movement from a neutral position to a reverse position. Similarly, movement of the actuator 12 toward the right in FIG. 1 is a movement from the neutral position toward the forward gear position. It should be understood, however, that these positions are not limiting to the present invention and can be altered to suit particular marine propulsion systems.

Figure 2:
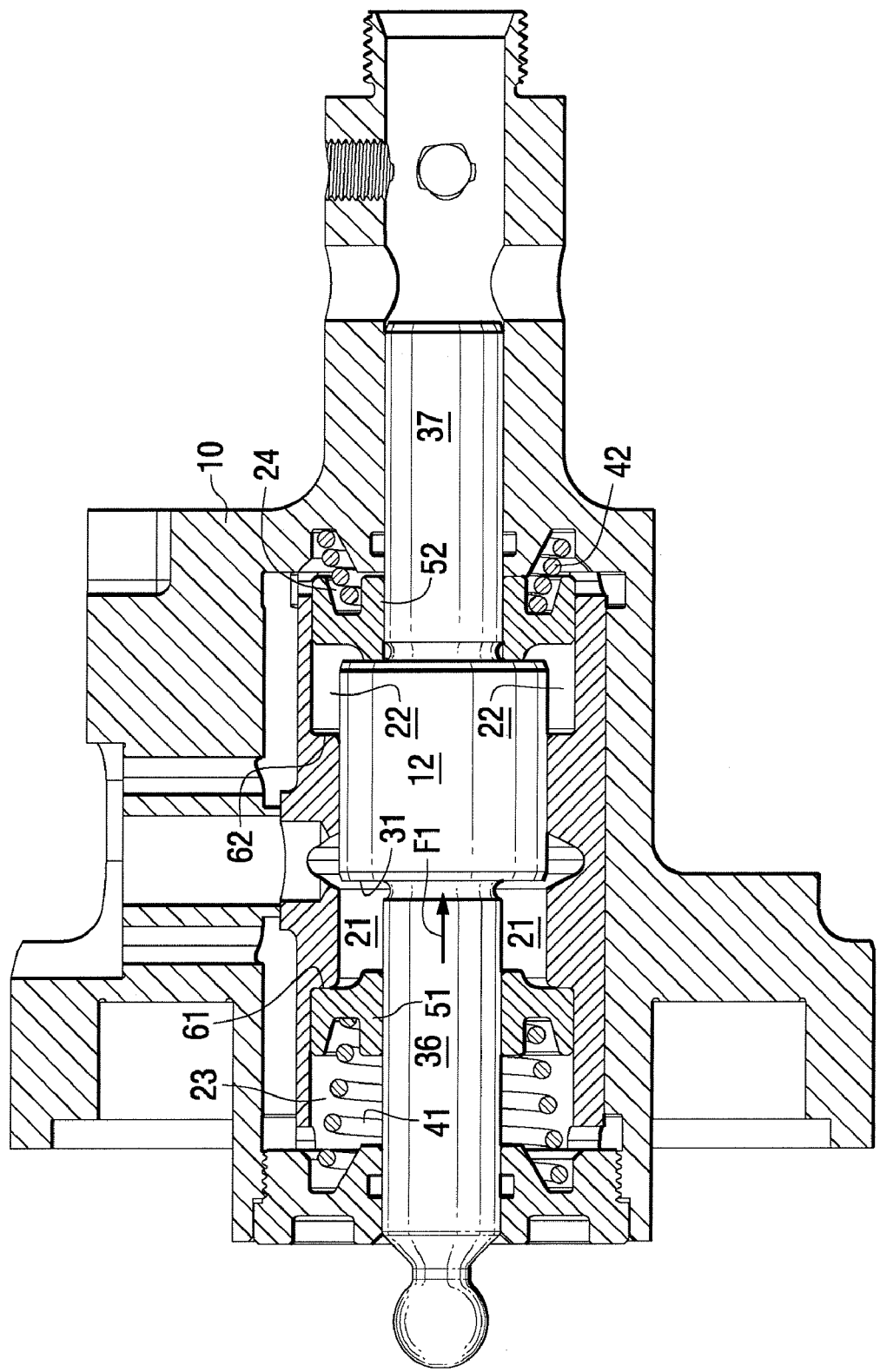
FIG. 2 is generally similar to FIG. 1, but with the actuator moved into a forward gear position.

FIG. 2 shows the actuation system of a preferred embodiment of the present invention with the actuator 12 moved toward the right into a forward gear position. This movement results from an increased hydraulic pressure in the first cavity 21 relative to the second cavity 22. More specifically, the pressures within the first and third cavities, 21 and 23, and the force provided by the first spring 41 result in a total force that exceeds that which results from the pressures in the second and fourth cavities, 22 and 24, in combination with the force provided by the second spring 42. The first ring 51 is maintained in position against the step 61 of the housing structure 10 while the second ring 52 is moved toward the right out of contact with its associated step 62. This movement of the actuator 12 causes the transmission to move from its neutral position to a forward gear position. Although not illustrated in FIGS. 1 and 2, it can be seen that the actuator 12 can also be moved toward the left, into a reverse gear position, by reversing the relative magnitudes of the pressures in the four cavities, 21-24.

Figure 3:
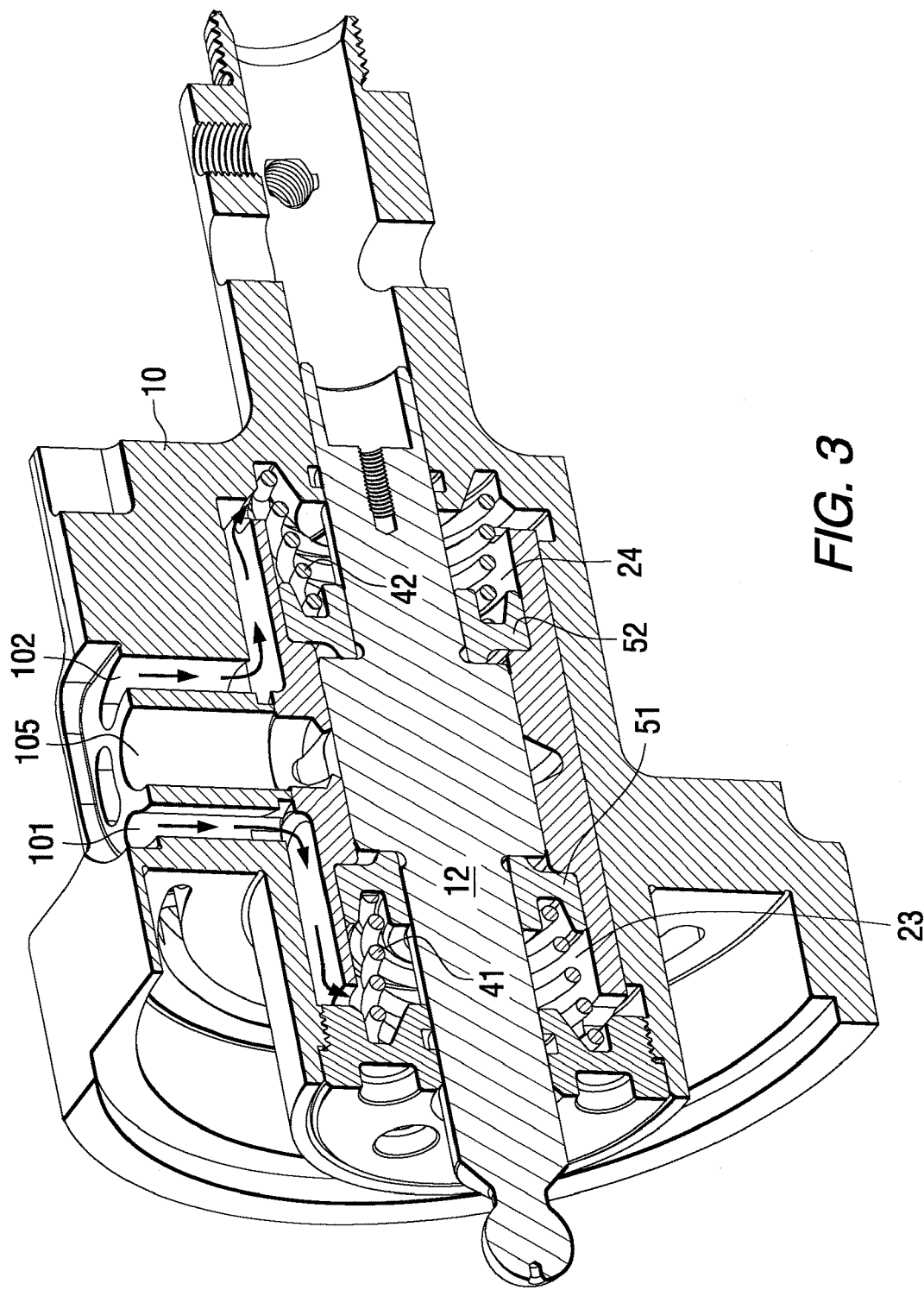
FIG. 3 is an isometric view of a preferred embodiment of the present invention which is sectioned to show particular hydraulic fluid paths within the structure of the actuation system.

FIG. 3 shows an actuation system in accordance with a preferred embodiment of the present invention, wherein the components are selectively sectioned to show specific passages for hydraulic fluid. A valve (not shown in FIGS. 1-3), such as a spool valve, is provided to selectively direct the flow of hydraulic fluid to and from the various cavities, 21-24. Many different types of valves are well known to those skilled in the art and will not be described in detail herein. However, it should be understood that, by selectively causing hydraulic fluid to flow under pressure to and from the various cavities, 21-24, the differential pressures described above can be easily achieved.

In FIG. 3, the section view shows the passages, 101 and 102, through which hydraulic fluid can flow into the third and fourth cavities, 23 and 24. The central passage 105 that is shown in FIG. 3 allows hydraulic fluid to return from the various cavities, 21-24, back to a reservoir associated with a pump.

Figure 4:
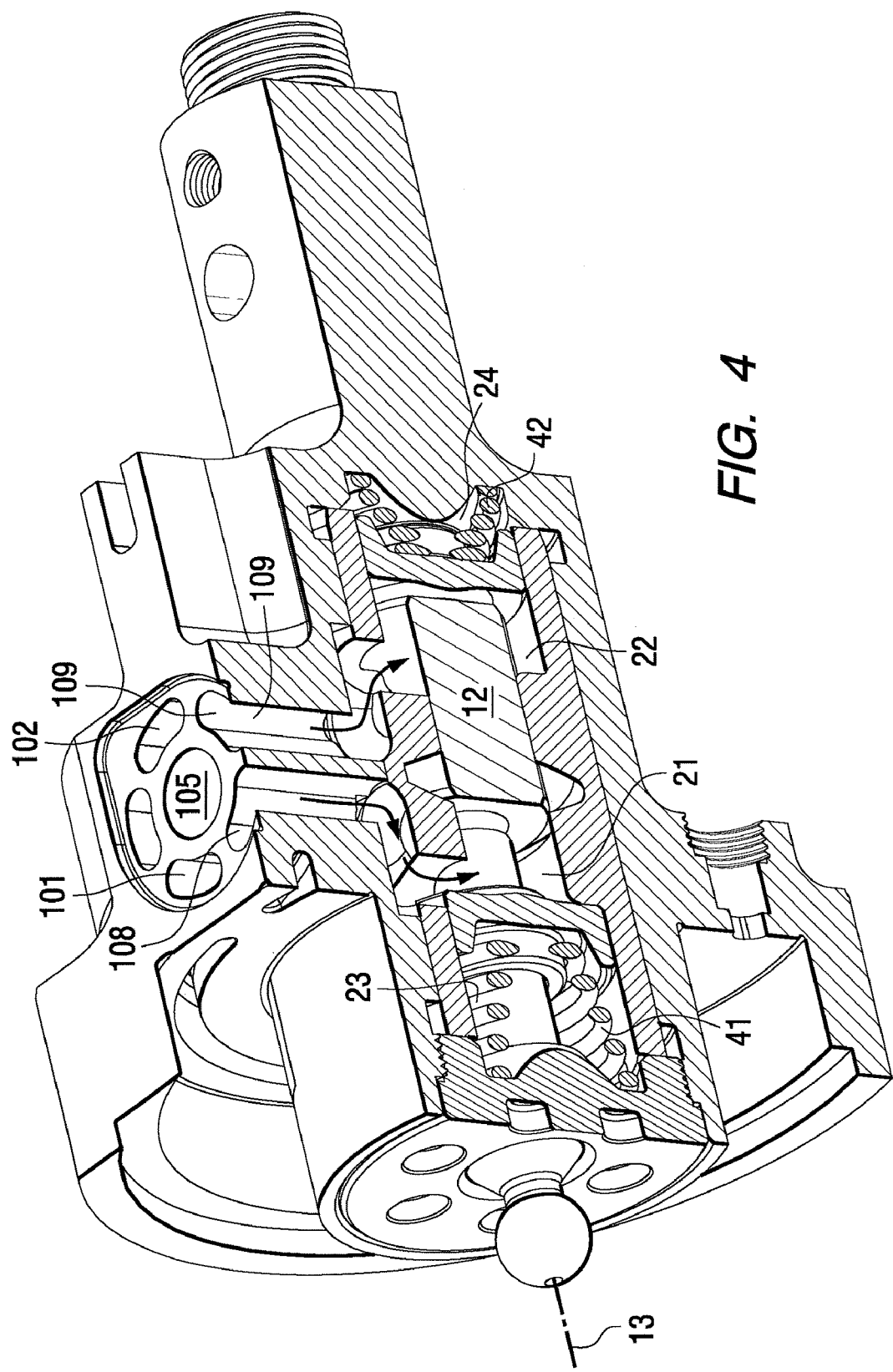
FIG. 4 is generally similar to FIG. 3, but with a different section taken to illustrate alternative hydraulic fluid paths.

FIG. 4 is an isometric section view that is particularly sectioned to show certain passages through which hydraulic fluid can flow into the first and second cavities, 21 and 22. Arrows represent the potential flow of fluid into these cavities. However, it should be understood that the flow of pressurized hydraulic fluid into the first and second cavities, 21 and 22, would typically be mutually exclusive since they produce forces in opposite directions. Therefore, the arrows in both FIGS. 3 and 4 are intended to show potential hydraulic fluid paths and not simultaneous hydraulic flows. Conduits 108 and 109 allow hydraulic fluid to flow along the paths represented by the arrows in FIG. 4. In FIG. 4, the actuator 12 is moved toward the right and into a forward gear position. Those skilled in the art will appreciate the fact that different differential pressure magnitudes within the four cavities, 21-24, will effectively and alternatively move the actuator 12 into a reverse gear position or a neutral gear position.

Figure 5:
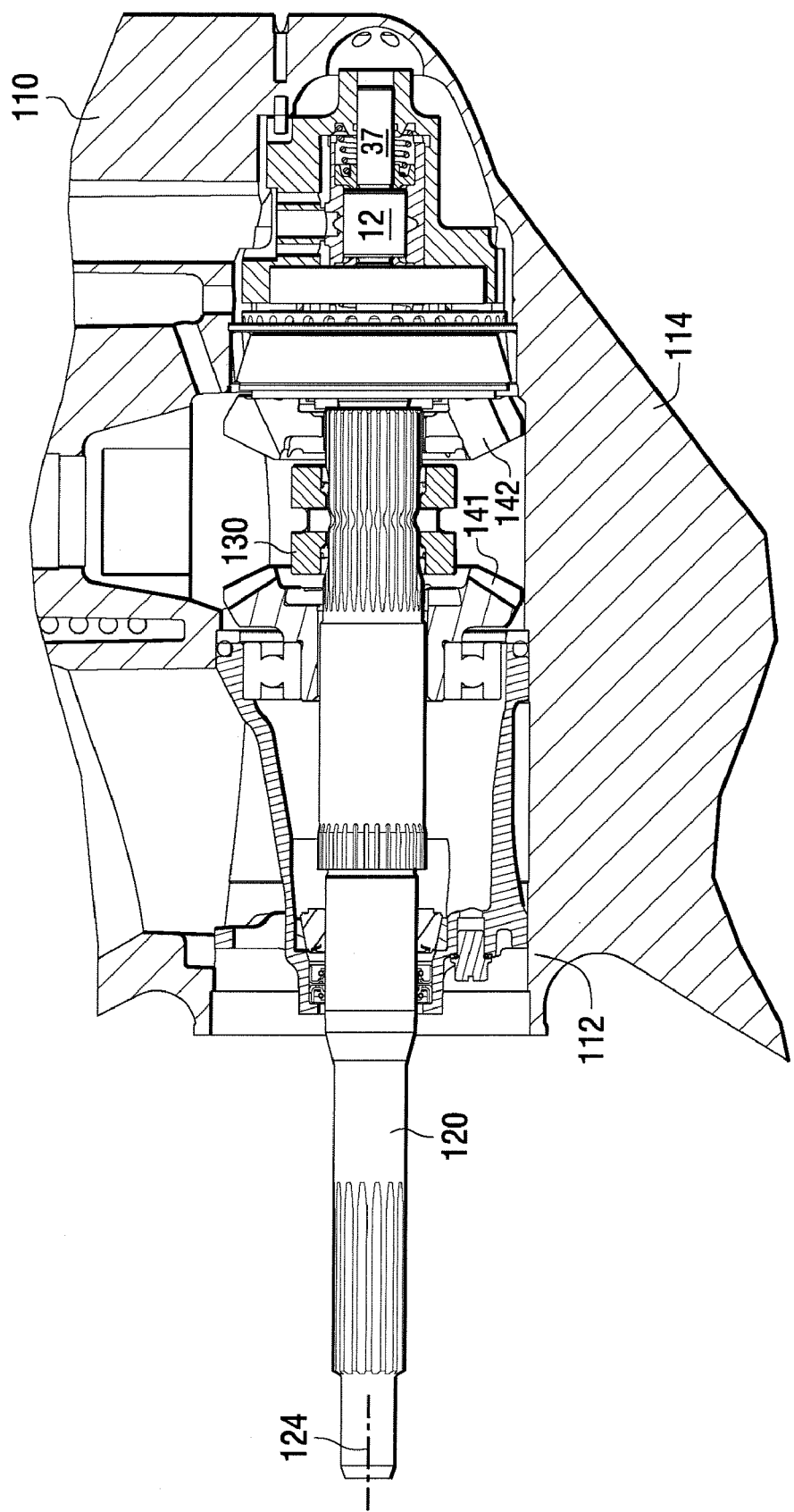
FIG. 5 is a section view of a marine propulsion device showing the relationship of a preferred embodiment of the present invention to a propeller shaft, a dog clutch, and forward and reverse bevel gears.

FIG. 5 is a section view showing a marine propulsion device 110 incorporating a preferred embodiment of the present invention. The gear case 112 of the marine propulsion device is illustrated along with a portion of a skeg 114 in order to show the relative positions of various components of a preferred embodiment of the present invention in conjunction with other components of the marine propulsion device. A propeller shaft 120 is supported for rotation about a generally horizontal propeller axis 124. A dog clutch 130 is supported by the gear case and is axially movable, parallel to axis 124, in response to the actuator of the present invention. The dog clutch 130 is able to move toward the left and toward the right in FIG. 5 to assume the reverse and forward gear positions described above. The position of the dog clutch 130 in FIG. 5 is its neutral gear position. A driveshaft is supported about a generally vertical axis in a manner that is well known to those skilled in the art of marine propulsion devices. The driveshaft and its associated bevel gear are not shown in FIG. 5. A reverse bevel gear 141 and a forward bevel gear 142 are supported for rotation about the centerline 124. Operation of the present invention causes the dog clutch 130 to move into engagement with either the reverse or forward bevel gears, 141 or 142, and cause the propeller shaft 120 to rotate in synchrony with the dog clutch 130.

With continued reference to FIG. 5, the actuator 12 of the present invention is shown at a location forward of the dog clutch 130. Fluid communication is provided, in a generally vertical direction, between a valve (not shown in FIG. 5) and the various cavities, 21-24, of a preferred embodiment of the present invention as described in greater detail above.

With continued reference to FIGS. 1-5, it can be seen that a marine transmission actuation system made in accordance with a preferred embodiment of the present invention comprises a housing structure 10 and an actuator 12 which is movably supported within the housing structure. First 21, second 22, third 23, and fourth 24, cavities are disposed at least partially between the actuator 12 and the housing structure 10. A first surface 31 of the actuator 12 has a first effective area which is responsive to hydraulic pressure within the first cavity 21 to exert a first force F1 against the actuator in a first direction. A second surface 32 of the actuator 12 has a second effective area which is responsive to a hydraulic pressure within the second cavity 22 to exert a second force F2 against the actuator 12 in a second direction. A third surface 33 of the actuator 12 has a third effective area which is responsive to hydraulic pressure within the third cavity 23 to exert a third force against the actuator in the first direction of force F1. A force surface 34 of the actuator 12 has a fourth effective area which is responsive to hydraulic pressure within the fourth cavity 24 to exert a fourth force against the actuator 12 in the second direction of force F2. The fourth effective area is larger than the first effective area. The actuator 12 is movable into forward, neutral, and reverse gear positions relative to the housing structure 10. The neutral gear position is between the forward and reverse gear positions in a preferred embodiment of the present invention. The actuator is movable in the first direction F1 from the reverse gear position to the neutral gear position and the actuator 12 is movable in the first direction F1 from the neutral position to the forward gear position. The actuator is movable in the second direction F2 from the forward gear position to the neutral gear position and is movable in the second direction F2 from the neutral gear position into the reverse gear position. In a particularly preferred embodiment of the present invention, the third effective area is larger than the second effective area, the first and third surfaces, 31 and 33, are movable relative to each other and the second and fourth surfaces, 32 and 34, are movable relative to each other. The actuator 12 is slidably supported by the housing structure 10 for movement along axis 13 which can be coaxial with the propeller shaft axis 124. The actuator 12 can comprise a piston member 28, a first ring 51, and a second ring 52. The first ring 51 defines the third surface 33 and the second ring 52 defines the fourth surface 34. The first and second rings, 51 and 52, are movable relative to the piston member in a direction parallel to the axis 13.

Although the present invention has been described in particular detail and illustrated specifically to show a particularly preferred embodiment, it should be understood that alternative embodiments are also within its scope.

We claim:

1. A marine transmission actuation system, comprising:
   a housing structure;
   an actuator movably supported within said housing structure;
   first, second, third, and fourth cavities disposed at least partially between said actuator and said housing structure;
   a first surface of said actuator having a first effective area which is responsive to pressure within said first cavity to exert a first force against said actuator in a first direction;
   a second surface of said actuator having a second effective area which is responsive to pressure within said second cavity to exert a second force against said actuator in a second direction;
   a third surface of said actuator having a third effective area which is responsive to pressure within said third cavity to exert a third force against said actuator in said first direction; and
   a fourth surface of said actuator having a fourth effective area which is responsive to pressure within said fourth cavity to exert a fourth force against said actuator in said second direction, said fourth effective area being larger than said first effective area.

2. The marine transmission actuation system of claim 1, wherein:
   said third effective area is larger than said second effective area.

3. The marine transmission actuation system of claim 1, wherein:
   said first and third surfaces are movable relative to each other.

4. The marine transmission actuation system of claim 3, wherein:
   said second and fourth surfaces are movable relative to each other.

5. The marine transmission actuation system of claim 1, wherein:
   said actuator is slidably supported by said housing structure for movement along an axis.

6. The marine transmission actuation system of claim 5, wherein:
   said actuator comprises a piston member, a first ring defining said third surface and a second ring defining said fourth surface; and
   said first and second rings being movable relative to said piston member in a direction parallel to said axis.

7. The marine transmission actuation system of claim 1, wherein:
   said actuator is movable into forward, neutral and reverse gear positions relative to said housing structure.

8. The marine transmission actuation system of claim 7, wherein:
   said neutral gear position is between said forward and reverse gear positions.

9. The marine transmission actuation system of claim 8, wherein:
   said actuator is movable in said first direction from said reverse gear position to said neutral gear position and is movable in said first direction from said neutral gear position to said forward gear position.

10. The marine transmission actuation system of claim 8, wherein:
    said actuator is movable in said second direction from said forward gear position to said neutral gear position and is movable in said second direction from said neutral gear position to said reverse gear position.

11. A marine transmission actuation system, comprising:
    a housing structure;
    an actuator movably supported within said housing structure;
    first, second, third, and fourth cavities disposed at least partially between said actuator and said housing structure;
    a first surface of said actuator having a first effective area which is responsive to hydraulic pressure within said first cavity to exert a first force against said actuator in a first direction;

a second surface of said actuator having a second effective area which is responsive to hydraulic pressure within said second cavity to exert a second force against said actuator in a second direction;

a third surface of said actuator having a third effective area which is responsive to hydraulic pressure within said third cavity to exert a third force against said actuator in said first direction, said first and third surfaces being movable relative to each other; and a fourth surface of said actuator having a fourth effective area which is responsive to hydraulic pressure within said fourth cavity to exert a fourth force against said actuator in said second direction, said fourth effective area being larger than said first effective area, said actuator being slidably supported by said housing structure for movement along an axis, said actuator being movable into forward, neutral and reverse gear positions relative to said housing structure.

12. The marine transmission actuation system of claim 11, wherein:

said third effective area is larger than said second effective area; and said second and fourth surfaces are movable relative to each other.

13. The marine transmission actuation system of claim 11, wherein:

said actuator comprises a piston member, a first ring defining said third surface and a second ring defining said fourth surface; and said first and second rings being movable relative to said piston member in a direction parallel to said axis.

14. The marine transmission actuation system of claim 11, wherein:

said neutral gear position is between said forward and reverse gear positions.

15. The marine transmission actuation system of claim 14, wherein:

said actuator is movable in said first direction from said reverse gear position to said neutral gear position and is movable in said first direction from said neutral gear position to said forward gear position.

16. The marine transmission actuation system of claim 14, wherein:

said actuator is movable in said second direction from said forward gear position to said neutral gear position and is movable in said second direction from said neutral gear position to said reverse gear position.

17. A marine transmission actuation system, comprising:

a housing structure;

an actuator movably supported within said housing structure;

first, second, third, and fourth cavities disposed at least partially between said actuator and said housing structure;

a first surface of said actuator having a first effective area which is responsive to hydraulic pressure within said first cavity to exert a first force against said actuator in a first direction;

a second surface of said actuator having a second effective area which is responsive to hydraulic pressure within said second cavity to exert a second force against said actuator in a second direction;

a third surface of said actuator having a third effective area which is responsive to hydraulic pressure within said third cavity to exert a third force against said actuator in said first direction; and a fourth surface of said actuator having a fourth effective area which is responsive to hydraulic pressure within said fourth cavity to exert a fourth force against said actuator in said second direction, said fourth effective area being larger than said first effective area, said actuator being movable into forward, neutral and reverse gear positions relative to said housing structure, said neutral gear position being between said forward and reverse gear positions, said actuator being movable in said first direction from said reverse gear position to said neutral gear position and said actuator being movable in said first direction from said neutral gear position to said forward gear position, said actuator being movable in said second direction from said forward gear position to said neutral gear position and is movable in said second direction from said neutral gear position to said reverse gear position.

18. The marine transmission actuation system of claim 17, wherein:

said third effective area is larger than said second effective area;

said first and third surfaces are movable relative to each other; and said second and fourth surfaces are movable relative to each other.

19. The marine transmission actuation system of claim 18, wherein:

said actuator is slidably supported by said housing structure for movement along an axis.

20. The marine transmission actuation system of claim 19, wherein:

said actuator comprises a piston member, a first ring defining said third surface and a second ring defining said fourth surface; and said first and second rings being movable relative to said piston member in a direction parallel to said axis.

* * * * *